(No Model.)
S. I. MERRILL.
FAUCET.
No. 473,325. Patented Apr. 19, 1892.
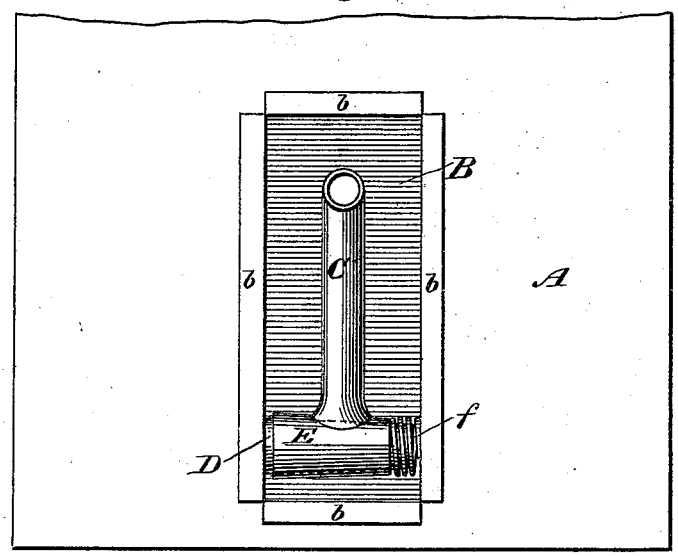
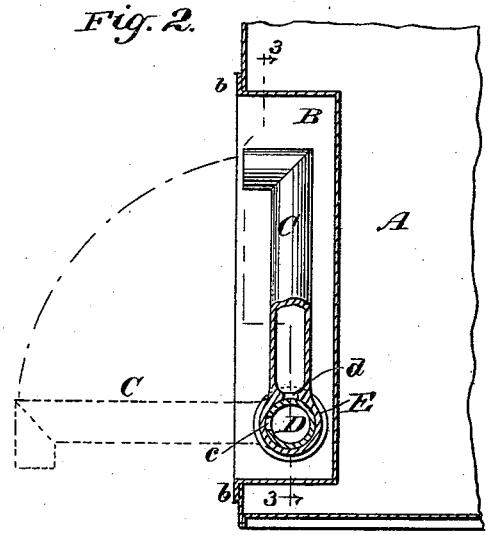 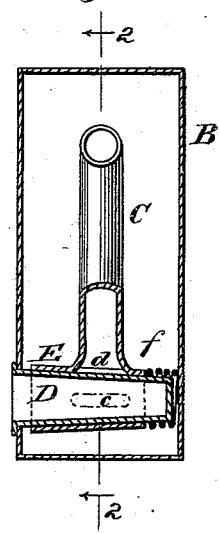
WITNESSES:
J. C. Criswell
C. Sedgwick
INVENTOR
S. I. Merrill
BY Munn & Co.
ATTORNEYS

UNITED STATES PATENT OFFICE.

SAMUEL INGHAM MERRILL, OF LOS ANGELES, CALIFORNIA.

FAUCET.

SPECIFICATION forming part of Letters Patent No. 473,325, dated April 19, 1892.

Application filed May 18, 1891. Serial No. 393,140. (No model.)

*To all whom it may concern:*

Be it known that I, SAMUEL INGHAM MERRILL, of the city and county of Los Angeles, in the State of California, have invented a new and useful Improvement in Faucets, of which the following is a full, clear, and exact description.

My invention relates to lever-spout faucets, more especially applicable to oil-cans, though also applicable to other liquid-holding cans or vessels, in which the spout of the faucet when the latter is closed shuts up under cover of the can or vessel and when open projects downward and outward from the same; and the invention consists in a special construction of such a faucet in connection with a recess, cavity, or chamber in the can or vessel receiving the same, substantially as hereinafter described, and more particularly pointed out in the claim.

While the invention is applicable to different kinds of vessels, both old and new, irrespective of any particular material of which they may be made, capable of holding liquids of various kinds, it will be found very advantageous as applied to oil-cans, and the faucet being inserted and securely fastened within a recess or chamber in the body of the can or vessel it will be found a very convenient one, which will be out of the way and fully protected when the can or vessel is being shipped, and this at a very slight expense.

Reference is to be had to the accompanying drawings, forming a part of this specification, in which similar letters of reference indicate corresponding parts in all the figures.

Figure 1 represents a front elevation of a can or vessel in part, with faucet applied and as closed or raised up within the chamber or recess in the body of the can; Fig. 2, a partly-sectional side elevation of the same upon the line 2 2 in Fig. 3 looking in direction of the arrows in the latter; and Fig. 3, a partly-sectional elevation upon the line 3 3 in Fig. 2 looking in direction of the arrows in Fig. 2.

A indicates an oil or other liquid-holding can or vessel having a recess or chamber B within the front portion of one side of its body. This chamber, with which the faucet is connected and to which it is securely attached, may either be a component part of a new can or vessel or, in case of applying the invention to an old can not so provided, the same may be done by simply cutting out a portion of the body of the can or vessel, adapted to receive the chamber within it, and then inserting said chamber within it and securing it to the body by outer flanges *b* and rivets or any suitable fastenings. Thus the invention may be said to require no special construction of can or vessel, but is applicable to almost any old form.

The chamber B presents an open front on the exterior of the can, and should be made of sufficient capacity and height to hold the faucet within it and so that when the faucet is closed its lever-spout C will occupy a raised position up within it, out of harm's way, and be fully protected both during transportation of the can or vessel and at other times, and so that when the lever-spout C is turned downward and outward, as represented by dotted lines in Fig. 2, flow of the oil or liquid out of the can or vessel is established through the faucet, the lever-spout C forming a handle by which to open and close the faucet. Said lever-spout is constructed at its outer end to also form a nozzle.

The body of the faucet consists of a tapering inner barrel D, arranged crosswise within the chamber B, and an outer tapering sleeve E, closely fitting over said barrel and having the lever-spout C connected with or forming part of it. The one end of the barrel D, which is firmly secured to the one side of the chamber B, is left open and has free communication with the interior of the can or vessel to admit of the passage of the liquid into it; but the opposite end of said barrel is closed. It also is provided with a front-side aperture or outlet *c* for passage of the liquid out through the faucet when the lever-spout C is thrown downward and outward, so as to bring an outlet-aperture *d* in its inner end in line with the outlet *c* of the barrel.

As it is desirable that the faucet should not work too freely, but should have a certain tension or resistance given it, I arrange a spring or elastic washer *f*, which is made to loosely encircle the inner and smaller closed end of the barrel D and to press against the inner smaller end of the closely-fitting sleeve E. This serves to hold the faucet closed and tight and produces friction enough to hold the lever-spout C in its raised position within the chamber B.

Having thus described my invention, what I claim as new, and desire to secure by Letters Patent, is—

The combination, with the chamber B, open at its front, and the tapering tubular barrel D, having its large end opening through the lower end of one side wall of chamber B, closed at its opposite end, and provided between its ends with a lateral opening $c$, the outer tapering sleeve E upon the barrel D and having a lateral opening $d$ to register with opening $c$, a spiral spring on the smaller end of barrel D and bearing at one end against the smaller end of sleeve E and bearing at its opposite end on the adjacent side wall of the chamber B, and the lever-spout C, secured to sleeve E over its opening $c$, substantially as set forth.

SAMUEL INGHAM MERRILL.

Witnesses:
 NICHOLAS L. RIGBY,
 EDWARD T. COOK,
 FRANK R. BOYER.